United States Patent
Romming et al.

(10) Patent No.: US 12,102,135 B2
(45) Date of Patent: Oct. 1, 2024

(54) METHOD AND MOUNTING FRAME FOR MANUFACTURING A VAPORIZER UNIT FOR AN INHALER

(71) Applicant: KÖRBER TECHNOLOGIES GMBH, Hamburg (DE)

(72) Inventors: Niklas Romming, Hamburg (DE); Lasse Cornils, Hamburg (DE); Jan Jaklin, Fellbach (DE); Thomas Müller, Hamburg (DE)

(73) Assignee: KÖRBER TECHNOLOGIES GMBH, Hamburg (DE)

( * ) Notice: Subject to any disclaimer, the term of this patent is extended or adjusted under 35 U.S.C. 154(b) by 251 days.

(21) Appl. No.: 17/614,198

(22) PCT Filed: Jun. 16, 2020

(86) PCT No.: PCT/EP2020/066601
§ 371 (c)(1),
(2) Date: Nov. 24, 2021

(87) PCT Pub. No.: WO2020/254307
PCT Pub. Date: Dec. 24, 2020

(65) Prior Publication Data
US 2022/0225686 A1 Jul. 21, 2022

(30) Foreign Application Priority Data
Jun. 18, 2019 (DE) .......................... 102019116450.8

(51) Int. Cl.
*A24F 40/70* (2020.01)
*A24F 40/10* (2020.01)
(Continued)

(52) U.S. Cl.
CPC .............. *A24F 40/70* (2020.01); *A24F 40/10* (2020.01); *A24F 40/42* (2020.01); *A24F 40/53* (2020.01);
(Continued)

(58) Field of Classification Search
CPC ... A24F 40/70; Y10T 156/1084; B29C 45/14; B32B 37/12
(Continued)

(56) References Cited

U.S. PATENT DOCUMENTS 9,943,114 B2 * 4/2018 Batista .................... A24F 40/70
2014/0270729 A1 9/2014 Depiano et al.
(Continued)

FOREIGN PATENT DOCUMENTS

CN 109 247 624 A 1/2019
DE 10 2016 120 803 A1 5/2018
(Continued)

OTHER PUBLICATIONS

Examination Report issued by the Japanese Patent Office dated Jul. 10, 2024 in parallel Japanese patent application No. 2021-575354.

*Primary Examiner* — Scott W Dodds
(74) *Attorney, Agent, or Firm* — SALIWANCHIK, LLOYD & EISENSCHENK (57) ABSTRACT

A method for manufacturing a vaporizer assembly for an inhaler comprises the steps of providing a plurality of connection stations and performing at least one assembly step at each connection station to produce a vaporizer assembly at each connection station.

5 Claims, 7 Drawing Sheets

(51) Int. Cl.
*A24F 40/42* (2020.01)
*A24F 40/53* (2020.01)
*B29C 45/14* (2006.01)
*B32B 37/02* (2006.01)
*B32B 37/12* (2006.01)
*B32B 37/14* (2006.01)
*B32B 38/18* (2006.01)

(52) U.S. Cl.
CPC .............. *B29C 45/14* (2013.01); *B32B 37/02* (2013.01); *B32B 37/12* (2013.01); *B32B 37/14* (2013.01); *B32B 38/18* (2013.01); *Y10T 156/1084* (2015.01)

(58) Field of Classification Search
USPC .................................................. 156/324, 269
See application file for complete search history.

(56) References Cited

U.S. PATENT DOCUMENTS

| | | |
|---|---|---|
| 2014/0299140 A1 | 10/2014 | Liu |
| 2015/0289565 A1 | 10/2015 | Cadieux et al. |
| 2016/0143363 A1 | 5/2016 | Boldrini |
| 2017/0181472 A1* | 6/2017 | Batista .................... A24F 40/46 |
| 2017/0332700 A1 | 11/2017 | Plews et al. |
| 2018/0177231 A1 | 6/2018 | Woodbine et al. |
| 2018/0303168 A1 | 10/2018 | Depiano et al. |
| 2019/0133186 A1 | 5/2019 | Fraser |
| 2019/0246696 A1 | 8/2019 | Schmidt et al. |
| 2021/0378317 A1* | 12/2021 | Testoni .................... B65B 43/54 |

FOREIGN PATENT DOCUMENTS

| | | |
|---|---|---|
| DE | 20 2018 102 268 U1 | 6/2018 |
| DE | 10 2017 111 119 A1 | 11/2018 |
| EP | 3 025 601 A1 | 6/2016 |
| JP | S 61214544 A | 9/1986 |
| JP | 2016-104009 A | 6/2016 |
| JP | 2018-501977 A | 1/2018 |
| KR | 10-2012-0080284 A | 7/2012 |
| WO | WO 2016/049910 A1 | 4/2016 |
| WO | WO 2016/127361 A1 | 8/2016 |
| WO | WO 2017/187148 A1 | 11/2017 |
| WO | WO 2018/125889 A1 | 7/2018 |

* cited by examiner

METHOD AND MOUNTING FRAME FOR MANUFACTURING A VAPORIZER UNIT FOR AN INHALER

CROSS REFERENCE TO RELATED APPLICATIONS

This application is a National Stage Application of International Application Number PCT/EP2020/066601, filed Jun. 16, 2020; which claims priority to German Patent Application No. 10 2019 116 450.8, filed Jun. 18, 2019.

FIELD OF INVENTION

The present invention relates to a method for manufacturing a vaporizer assembly for an inhaler, preferably an electronic cigarette.

BACKGROUND OF THE INVENTION

EP 3 025 601 B1 discloses a method for manufacturing a vaporizer cartridge for an electronic cigarette, in which electrodes for the connections of an electric heater are continuously punched out of a sheet metal strip.

JPS 61214544 discloses the electrical connection of a semiconductor element to a stamped grid, wherein the semiconductor element is encapsulated and singulated.

The task of the invention is to provide an effective mass production method for vaporizer assemblies, wherein the vaporizer is to be electrically reliably connected and thermally decoupled as much as possible.

The invention solves this task with the features of the independent patent claims.

BRIEF SUMMARY OF THE INVENTION

According to the invention, a plurality of connection stations is provided and at least one assembly step, preferably a plurality of assembly steps, is carried out at each connection station in order to produce one vaporizer assembly at each connection station.

In a particularly preferred embodiment, the connection stations are connected to each other by an assembly framework. The assembly framework is advantageously metallic, belt-shaped and/or rollable/unrollable. By means of the assembly framework, a multiplicity of connection stations for vaporizers can thus be provided for machine processing in a continuous belt-like arrangement.

For the electrical connection of the vaporizer, at least one electrically conductive connection surface (bonding surface), for example made of gold, is advantageously provided at each connection station.

The assembly method advantageously comprises an assembly step of connecting a vaporizer support to the or each connection station. This may be particularly advantageously performed by overmolding the assembly framework with a plastic material. Furthermore, an assembly step of connecting a vaporizer to the or each connection station is advantageously provided, in particular by means of an adhesive.

The electrical connection of each vaporizer is then advantageously made by electrical connection and/or wiring to the or each electrically conductive connection surface.

Advantageously, the assembly method comprises one or more of the group of assembly steps of: placing and/or connecting a wick element in or to the vaporizer assembly; inserting at least one sealing element for fluid sealing into the or each vaporizer assembly; placing and/or connecting an identification element in or to the vaporizer assembly; encasing the or each vaporizer assembly with a vaporizer housing; connecting a vent to a vent receptacle of the or each vaporizer assembly; mounting and/or filling a liquid tank on the or each vaporizer assembly.

At a suitable point in the assembly process, partial singulation of the at least partially assembled vaporizer assembly may be performed, particularly by separating it from the assembly framework on one side. Thereafter, a prefabricated vaporizer housing may be slid onto the free end of the vaporizer assembly, for example. However, it is also possible to produce the vaporizer housing at the connection station by injection molding.

Finally, a complete singulation of the vaporizer assembly is performed by completely separating it from the assembly framework to obtain vaporizer assemblies, vaporizer units or vaporizer cartridges, depending on the embodiment.

The assembly framework according to the invention is advantageously belt-shaped, is preferably provided in a substantially endless manner and is advanced to carry out assembly steps, preferably in a work-paced manner. In an advantageous embodiment, the assembly framework comprises at least one, advantageously several, longitudinal webs extending in an advancing direction, wherein the connection stations are advantageously arranged in one or more rows parallel to the longitudinal webs. Guide elements or openings are preferably provided at periodic distances on or in at least one longitudinal web.

Further advantageously, the assembly framework comprises at each connection station at least one transverse web which extends transversely starting from at least one longitudinal web. In a preferred embodiment, at least a portion of the at least one transverse web remains permanently in the vaporizer assembly and advantageously forms in the final product at least one electrical connection for electrical contacting of the vaporizer.

BRIEF DESCRIPTION OF THE FIGURES

The invention is explained below by means of preferred embodiments with reference to the accompanying figures. Thereby shows FIG. 1 a perspective view from above of an assembly framework.

DETAILED DESCRIPTION

Figure 1:
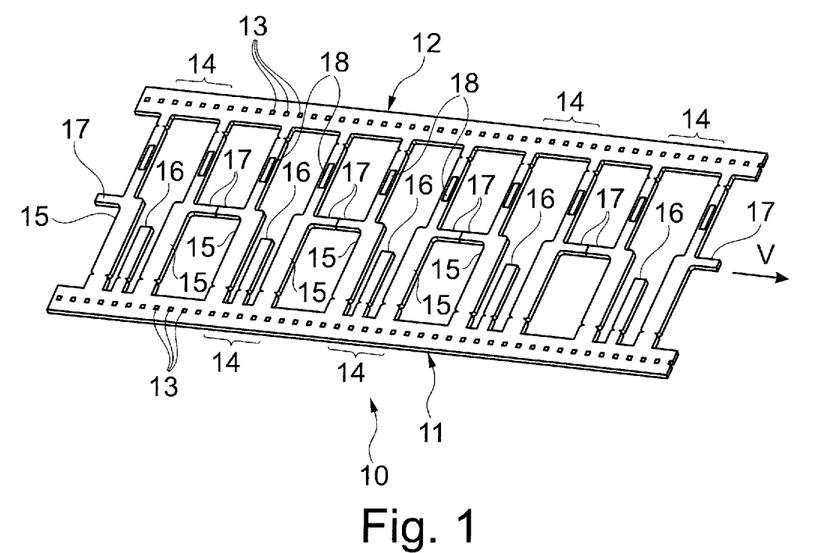

The assembly framework 10, which is in particular belt-shaped, extends continuously or quasi-endlessly along a longitudinal direction V which corresponds to an advancing direction V when processed in a manufacturing machine. FIG. 1 shows only a cutout of a complete assembly framework 10. The assembly framework 10 is intended and arranged for continuous processing in one or more assembly machines; this will be explained in detail later. For assembly, the assembly framework 10 is advanced in the direction of advance V in the assembly machine or machines. Advantageously, the assembly framework 10 is unwound from a roll and is therefore advantageously unrollable and/or rollable. It may be advantageous to roll up the assembly framework 10 again after completion of an assembly step (in an assembly machine) and to unroll it again for a subsequent assembly step (possibly in a subsequent assembly machine), for example if the individual assembly steps or the individual assembly machines are timed differently. Individual belts can be changed to any length during the manufacturing process, for example, by punching and/or splicing, such as by welding, to enable a continuous process and/or to change the roll size.

The assembly framework 10 here comprises, for example, two longitudinal webs 11, 12 extending continuously or quasi-endlessly in the advancing direction, which are advantageously arranged parallel to one another. In other embodiments, only one longitudinal web or more than two longitudinal webs (see FIG. 15) may be provided. The longitudinal web or webs 11, 12 serve to transport or advance the assembly framework 10 in the machine, and for this purpose may comprise guide elements or, as here, guide openings 13 at regular intervals along the longitudinal direction V, in which, for example, corresponding guide parts of the machine engage.

Along the longitudinal or advancing direction of the assembly framework 10, connection stations 14 are formed continuously and at regular intervals. In FIG. 1, for example, five connection stations 14 are shown. Each connection station 14 is used to manufacture a corresponding vaporizer assembly for a respective inhaler. Each connection station 14 is advantageously formed by one or more transverse webs 15, 16 extending transversely to the longitudinal webs 11, 12. The assembly framework 10 advantageously comprises continuous transverse webs 15 extending from one longitudinal web 11 to the other longitudinal web 12, thereby holding the assembly framework 10 together. Advantageously, at least one transverse web 15, and further advantageously a plurality of transverse webs 15, for example two continuous transverse webs 15, are provided per connection station 14.

Furthermore, at least one transverse web 16 may be provided per connection station 14 which, starting from only one longitudinal web 11, does not extend continuously, i.e. does not extend to the other longitudinal web 12.

Spacers 17 may be provided on the or each continuous transverse web 15, advantageously extending in the longitudinal direction V between each two connection stations 14 and defining and/or maintaining the distance between the respective connection stations 14.

The assembly framework 10 advantageously comprises a conductive material, in particular a metal, and is advantageously bendable with respect to workability. In an advantageous embodiment, the assembly framework 10 is made of a sheet metal and is, for example, stamped from a sheet metal and then forms a stamped grid. Non-metallic materials, for example plastic, which may be conductive or metallically coated, are possible for the assembly framework 10.

In the following, the production of vaporizer assemblies 50 is explained with reference to FIGS. 2 to 14.

In a preliminary step, the assembly framework 10 is produced, for example, by rolling. Subsequently, the assembly framework 10 is formed into a shape that can be machined (see FIG. 1), for example by stamping.

Thereafter, an at least partial surface finishing or electroplating of the assembly framework 10 can optionally be carried out by means of material application, embossing and/or polishing. For example, the stamped assembly framework 10 can be overmolded with plastic and the plastic can then serve as a mask for downstream gold plating by means of electroplating.

Figure 2:
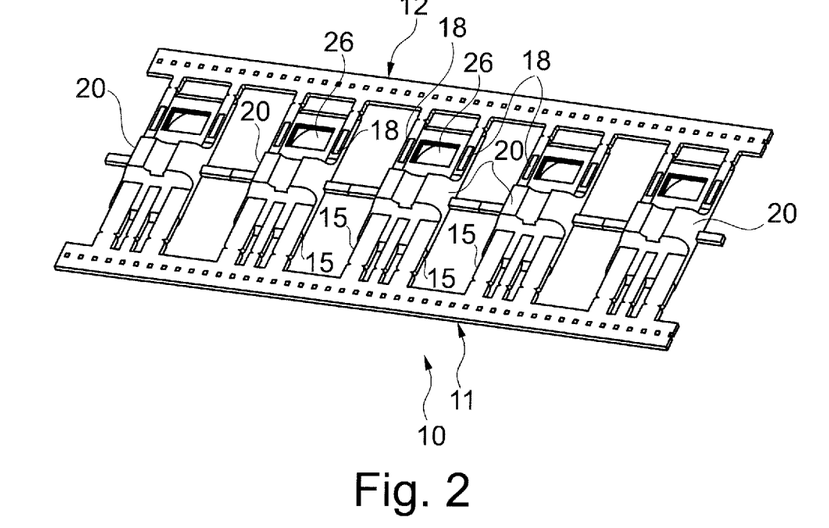
FIG. 2 a perspective view from above of an assembly framework with vaporizer supports connected to the connection stations.

In an assembly step according to FIG. 2, a vaporizer support 20 is connected to each connection station 14 starting from the assembly framework 10. The vaporizer support 20 can advantageously consist of a suitable plastic, for example PEEK, and can advantageously be resistant to outgassing up to 300° C. To produce the vaporizer support 20, for example, the assembly framework 10, in particular one or more transverse webs 15, 16 at the corresponding connection station 14 can be overmolded. For this purpose, an assembly framework 10 (see FIG. 1) is, for example, pulled off a roll and passed through a multiple injection mold not shown. At least one electrical connection surface 18, for example made of gold, can be provided in the assembly framework 10, in particular in at least one transverse web 15.

After the assembly framework 10 has been overmolded at a connection station 14, the assembly framework 10 continues to be guided in the longitudinal direction V. After leaving the injection mold, the assembly framework 10 shown in FIG. 2 with attached vaporizer supports 20 is either rolled onto a roll or further processed in-line. In the latter case, a buffer is advantageously provided for intermediate storage of the assembly framework 10 shown in FIG. 2, since the processing speeds of the injection mold and subsequent processing devices may generally differ.

Other methods are possible, for example, the vaporizer support 20 may be prefabricated by injection molding, for example, and clipped into the assembly framework 10 at the corresponding connection station 14. The vaporizer support 20 may also be made of other material, such as ceramic or a composite material.

Figure 3:
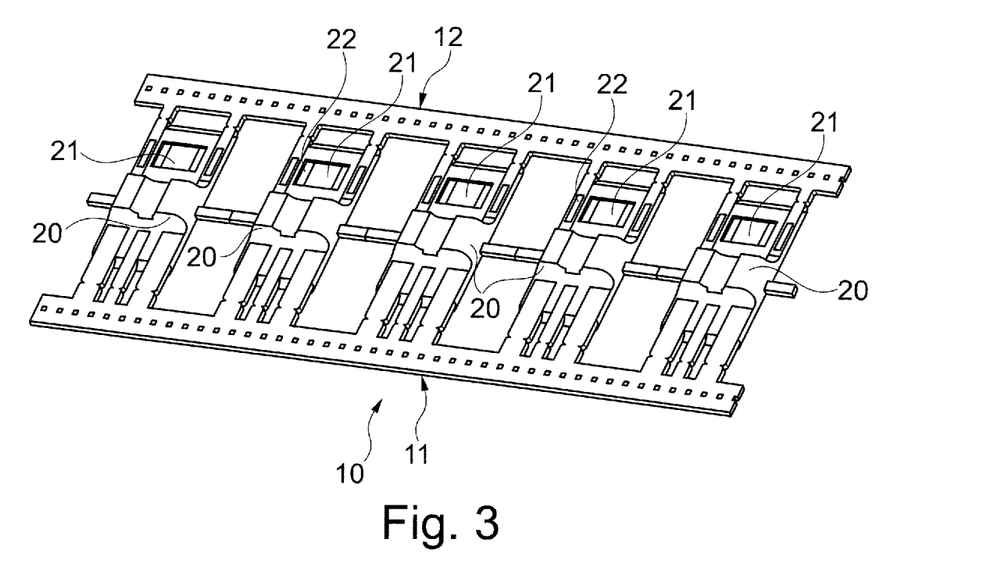
FIG. 3 a perspective view from above of an assembly framework with vaporizers connected to the connection stations.
Figure 4:
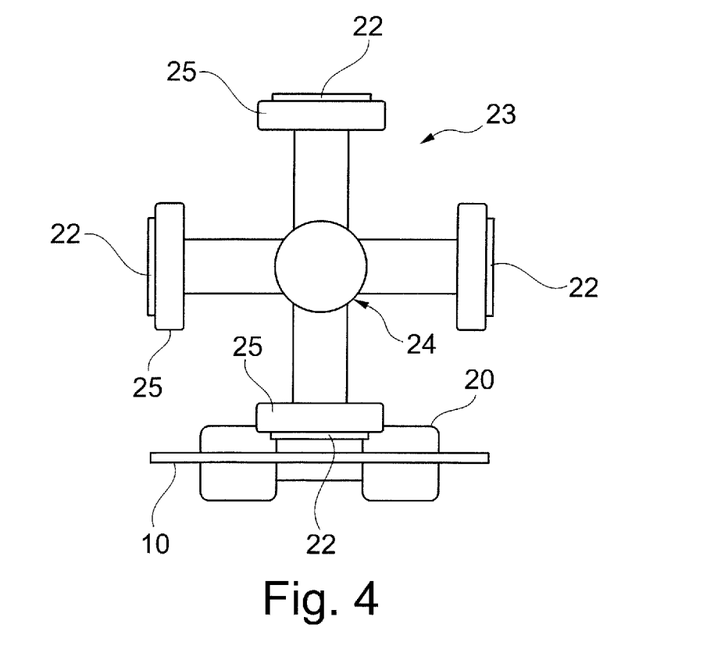
FIG. 4 a schematic view of a printing device for applying adhesive to vaporizer supports.

In a subsequent assembly step according to FIG. 3, a vaporizer 21 is placed at each connection station 14, for example in a recess of the vaporizer support 20 (see FIG. 2), and connected to the vaporizer support 20. For this purpose, an assembly framework 10 equipped with vaporizer supports 20 (see FIG. 2) is pulled off a roll, for example, and guided through a placement and connection tool that is not shown. Alternatively, this assembly step can also be performed in batch mode (batch operation).

The connection of the vaporizer 21 to the vaporizer support 20 can be done, for example, by means of an adhesive 22. In one embodiment, the adhesive 22 can be applied to the vaporizer support 20 in-line, i.e. in the manufacturing process, by means of an application device 23. The application device 23 may comprise, for example, a wheel-shaped print head 24 with a plurality of, for example, four print stamps 25 for pad printing, see FIG. 4. Other adhesive application devices are possible. The adhesive 22 is advantageously temperature resistant up to at least 300° C. and outgassing resistant to toxic fumes, as well as resistant to the vaporization liquid.

The adhesive 22 may be applied to the vaporizer support 20 (as in FIG. 4) before the vaporizer 21 is bonded to the vaporizer support 20 via the adhesive 22. Alternatively, adhesive 22 may be applied to vaporizer 21 before the vaporizer 21 is bonded to vaporizer support 20 via adhesive 22. It is also advantageously possible to first place the vaporizer 21 on the vaporizer support 20 and then dispense the adhesive 22, for example in liquid form. The adhesive 22 may be arranged on a front side and/or on an outer side of the vaporizer 21.

In a subsequent step, the adhesive 22 is cured. This can be done by drying in air or advantageously by applying heat, in particular in an oven. Alternatively, it is also possible to use UV-curable adhesive 22, which is then cured by means of UV radiation. Curing can be carried out batch-wise or in a continuous process, for example in a continuous oven.

After leaving the placement and connection tool, the assembly framework 10 shown in FIG. 3 with attached vaporizers 21 is either rolled onto a roll or further processed in-line. In the latter case, a buffer is advantageously provided for intermediate storage of the assembly framework 10 shown in FIG. 3, since the processing speeds of the placement and connection tool and subsequent processing devices can generally differ.

Figure 5:
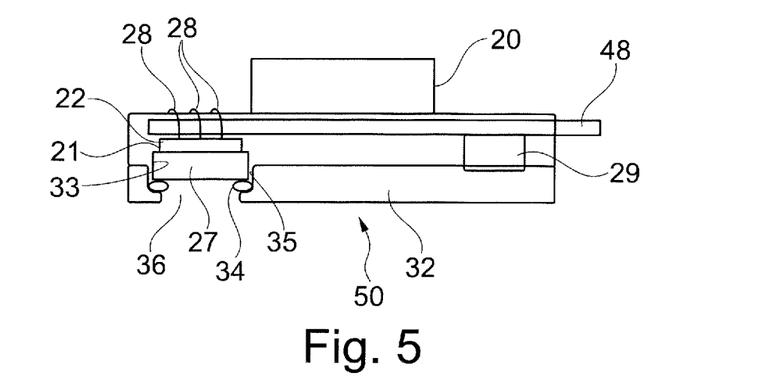
FIG. 5 a cross-sectional view of a vaporizer assembly.

In an advantageous embodiment, the vaporizer 21 is attached to the rear of the vaporizer support 20. This is best illustrated in FIG. 5. Accordingly, the adhesive 22, which is ring-shaped for example, is arranged on a vapor outlet side of the vaporizer 21 and is bonded to a rear side of the vaporizer support 20, i.e. from the underside in the view according to FIG. 3. This rear-side arrangement of the vaporizer 21 has the advantage that a force between the vaporizer 21 and a wick element 27 to be explained later does not weaken the adhesive bond of the adhesive 22 and thus lower requirements can be placed on the adhesive 22.

Figure 6:
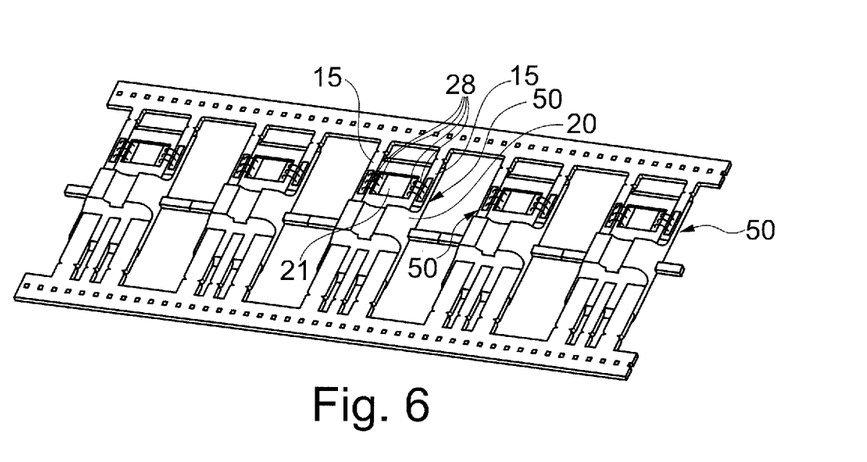
FIG. 6 a perspective view from above of an assembly framework with electrically connected or wired vaporizers.

In a subsequent assembly step as shown in FIG. 6, each vaporizer 21 is electrically bonded or wired (wire-bonding) in a wiring device by means of electrical lines 28. For this purpose, an assembly framework 10 equipped with vaporizers 21 (see FIG. 3) is pulled off a roll, for example, and continuously fed through a wiring device not shown. Alternatively, the electrical connection can also be carried out in batches (i.e. in batch operation). The electrical connection of the vaporizer 21 is advantageously carried out in such a way that the two electrical connections of the heating resistor forming the vaporizer 21 are each connected to a transverse web 15, for example by soldering, by means of one or more, for example three, electrical lines 28 or connecting wires, as shown in FIG. 6. The lines 28 may be made of gold or aluminum, for example, but steel wire or other suitable materials are not excluded. Portions of the transverse webs 15 remain permanently in the vaporizer assembly 50 and in the final product form the electrical connections 48 for connecting the vaporizer assembly 50 to a base part of an inhaler, see FIGS. 12 and 13. As can be seen from FIG. 13, the electrical lines 28 are advantageously arranged for efficient cooling in an air channel 26 extending through the vaporizer housing 51 between the vent opening 47 and an opposite face opening 30 in the flange 40. Advantageously, electrical connections 48 for connecting the vaporizer cartridge 52 to a base part of an inhaler extend outwardly through the flange 40 through the face opening 30.

Figure 7:
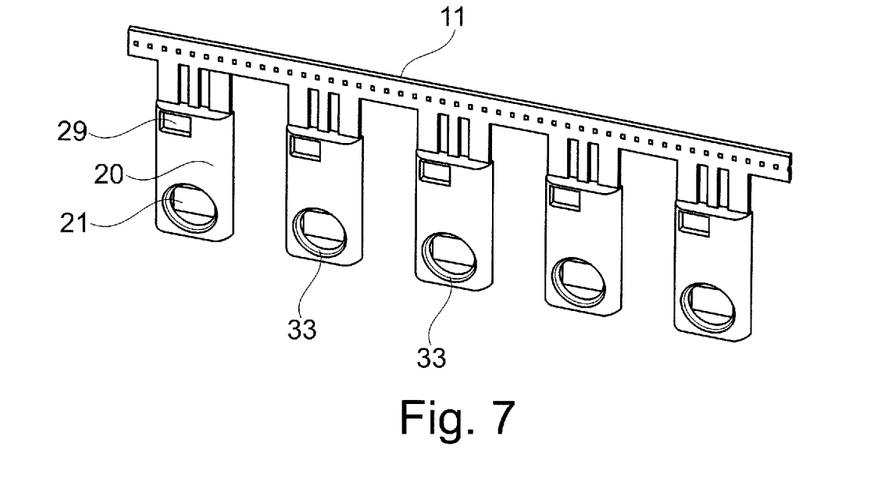
FIG. 7 a perspective view from below of an assembly framework with identification element.

In an optional step according to FIG. 7, an identification element 29 (ID chip) can be inserted into each vaporizer assembly 50 or vaporizer support 20. The identification element 29 is used to uniquely identify the corresponding vaporizer 21 and may be, for example, an RFID element, an NFC element, or a digital memory device (such as an EEPROM) in which a digital identifier is stored. If the identifier element 29 is electrically bonded, this can advantageously be done by means of wiring in the aforementioned wiring device. The placement and attachment of the identification element 29 can be done in the assembly step according to FIG. 3, in an earlier assembly step, or in a later assembly step.

Figure 8:
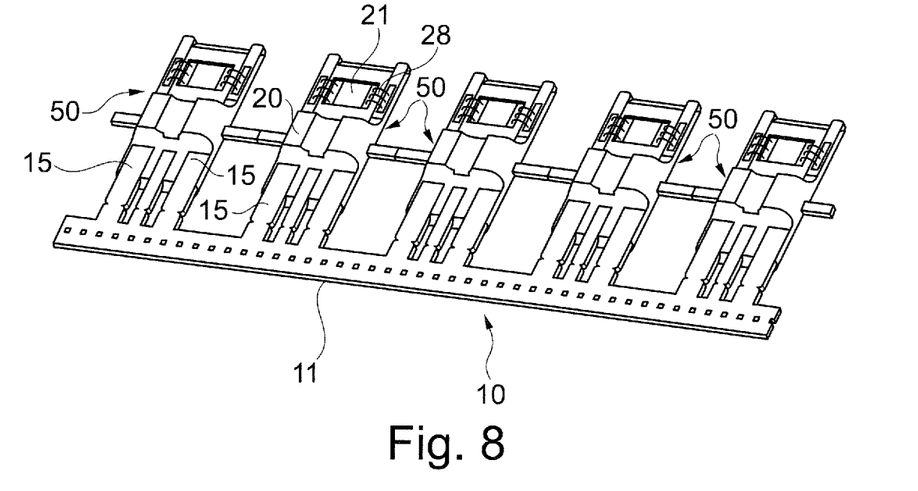
FIG. 8 a perspective view from above of an assembly framework with partially singulated vaporizer assemblies.

At a suitable time in the assembly process, partial singulation of the vaporizer assemblies 50 may optionally be performed as shown in FIG. 8. In the present embodiment, in which the vaporizer assemblies are held on both sides, this means that one of the longitudinal webs 12 is removed from the assembly framework 10 and the vaporizer assemblies 50 are held on only one side of the remaining longitudinal web 11. The singulation can be done, for example, by punching. The assembly framework 10 or the transverse webs 15 can comprise corresponding predetermined breaking points. During partial singulation, any burrs from injection molding of the vaporizer support 20 can also be removed and accuracy increased. FIG. 7 already shows the assembly framework 10 after partial singulation.

Figure 9:
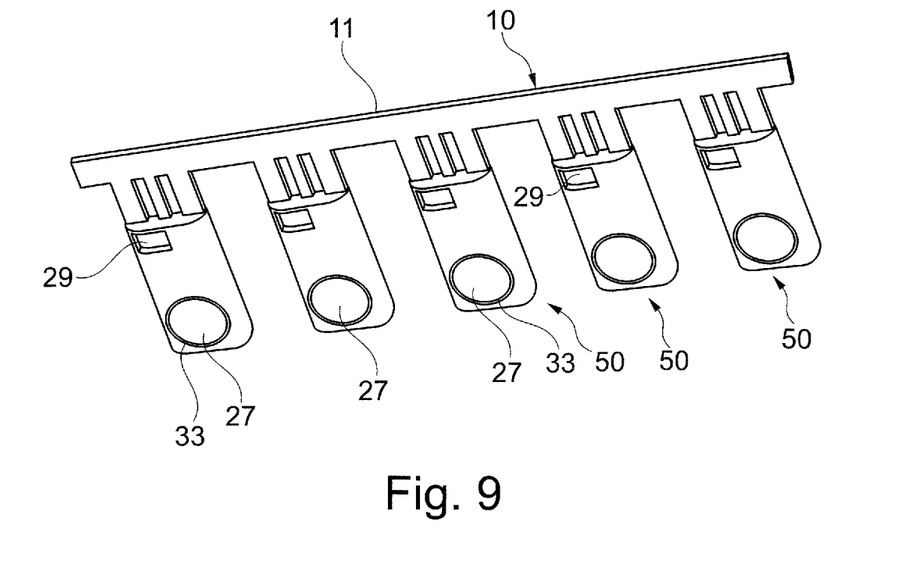
FIG. 9 a perspective view from below of an assembly framework with partially singulated vaporizer assemblies.

Advantageously, in a further assembly step as shown in FIG. 9, a wick element 27 is placed on each vaporizer assembly 50 or each vaporizer support 20 and bonded thereto. The wick element 27 is used in the finished product to transport liquid to be vaporized from a liquid reservoir 31 (see FIG. 13) to the vaporizer 21 by means of capillary forces. For this purpose, the wick element 27 lies advantageously planar. To place the wick element 27, the assembly framework 10 (see FIG. 3), which may be separated and equipped with vaporizer 21, is pulled off a roll, for example, and continuously guided through a placement device not shown. Alternatively, the electrical connection can also be made in batches (i.e. in batch operation).

The wick element 27 is advantageously placed in a wick receptacle 33 or hollow space (cavity) of the vaporizer support 20 in fluid-conducting connection with the vaporizer 21. A nonwoven fabric, for example a glass fiber nonwoven fabric, may optionally be disposed between the wick element 27 and the vaporizer 21. The the wick element 27 may, for example, be made of ceramic. Fixation of the wick element 27 in the wick receptacle 33 may be achieved, for example, by means of a clamp, such as when the wick element 27 comprises an oversize relative to the wick receptacle 33. Alternatively, fixation of the wick element 27 in the wick receptacle 33 may be accomplished by means of an adhesive, for example from the outside, or between the wick element 27 and the wick receptacle 33, or between the wick element 27 and the vaporizer, wherein in the latter case the adhesive advantageously contracts upon curing so that the wick element 27 is permanently pressed against the vaporizer. Where an adhesive is used to fix the wick element 27 in the wick receptacle 33, this is cured in a subsequent step. This can be done by drying in air or advantageously by applying heat, in particular in an oven. Alternatively, it is also possible to use UV-curable adhesive, which is then cured by means of UV radiation. Curing can be carried out batchwise or in a continuous process, for example in a continuous oven.

After leaving the placement device, the assembly framework 10 shown in FIG. 9 with placed wick elements 27 is either rolled up onto a roll or further processed in-line. In the latter case, a buffer is advantageously provided for intermediate storage of the assembly framework 10 shown in FIG. 9.

In the embodiment shown in FIG. 5, a lower shell 32 is provided on the underside of the vaporizer support 20. The lower shell 32 may comprise a separate part that is, for example, clipped to the vaporizer support 20 or may be otherwise connected to the vaporizer support 20. Alternatively, the lower shell 32 may be integrally formed with the vaporizer support 20 in the same injection molding process. In embodiments having a lower shell 32, the wick element 27 may be at least partially disposed within the lower shell 32.

For assembly, the wick element 27 is first placed in the receptacle 33 of the vaporizer support 20. Then, to seal a liquid inlet opening 36 of the lower shell 32, an elastomeric sealing element 34, for example in the form of a sealing ring, may be arranged in a hollow space 35 around the liquid inlet opening 36. Subsequently, the assembly of vaporizer support 20 with vaporizer 21 can be placed on the lower shell 32, for example by lowering or bending the assembly framework 10. Alternatively, the lower shell 32 can be attached to the vaporizer support 20, for example by an assembly robot. When assembled, the sealing element 34 advantageously exerts a permanently elastic force on the wick element 27 against the vaporizer 21.

The wick element 27 may be round in cross-section or comprise any other suitable cross-sectional shape. The cross-sectional shape of the wick element 27 may be adapted to the shape of the vaporizer 21. The lower shell 32 may be bonded to the vaporizer support 20 for sealing purposes. The identification element 29 can thereby be encapsulated in a tamper-proof manner.

Figure 10:
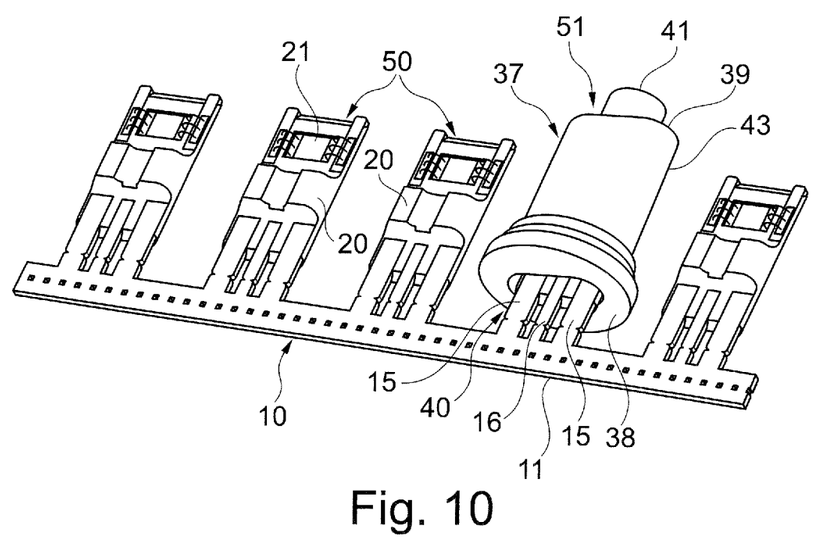
FIG. 10 a perspective view from above of an assembly framework with a vaporizer housing attached to form a vaporizer unit.
Figure 11:
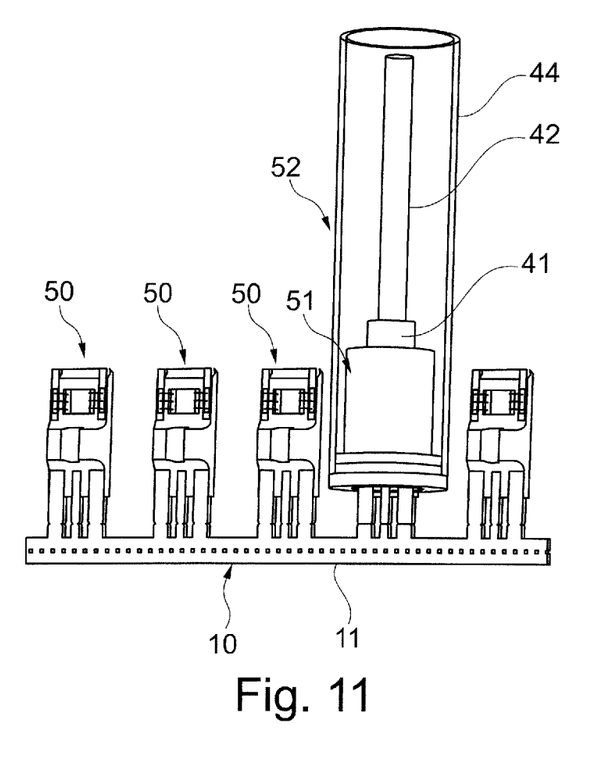
FIG. 11 a perspective view from above of an assembly framework with cartridge housing attached to form a vaporizer cartridge.

In a subsequent assembly step as shown in FIG. 10, a vaporizer housing 37 is connected to a vaporizer assembly 50 to form a vaporizer unit 51. The vaporizer housing 37 is advantageously elongated with two end faces 38, 39 and a shell part 43, wherein a flange 40 for an electrical interface 49 may advantageously be provided on an end face 38 and/or a vent receptacle 41 may advantageously be provided on an end face 29 for connection to a vent 42 to be explained later. The vaporizer housing 37 may advantageously be made of a suitable plastic, for example polypropylene.

For assembly, the vaporizer housing 37 is advantageously slidable over the vaporizer assembly 50, as shown in FIG. 10. In the inserted state, the transverse webs 15, 16 advantageously project outwardly beyond the vaporizer housing 37, so that after subsequent singulation the transverse webs 15, 16 form the electrical interface for the base part of the inhaler, see FIG. 12.

To seal the vaporizer housing 37 against the vaporizer support 20, for example, an adhesive can be applied to the vaporizer housing 37 and/or the vaporizer support 20 before insertion, in particular over a large area. Alternatively, an adhesive can be applied or pressed locally into a groove provided in the vaporizer support 20, for example, through the vent opening 47 in the vent mount 41, or through an additional opening in the liquid tank 44. Furthermore, a sealing groove can be welded locally around the wick element 27 preferably from the outside by heat treatment, for example by ultrasonic or thermosonic welding. The welding can be done efficiently, for example, by radiating through the liquid tank 44 by means of a laser beam. Sealing of the vaporizer housing 37 against the vaporizer support 20 ensures that vaporization liquid can only flow into the space around the wick element 27. On the vaporizer side, tightness is established by pores of the vaporizer 21.

Figure 14:
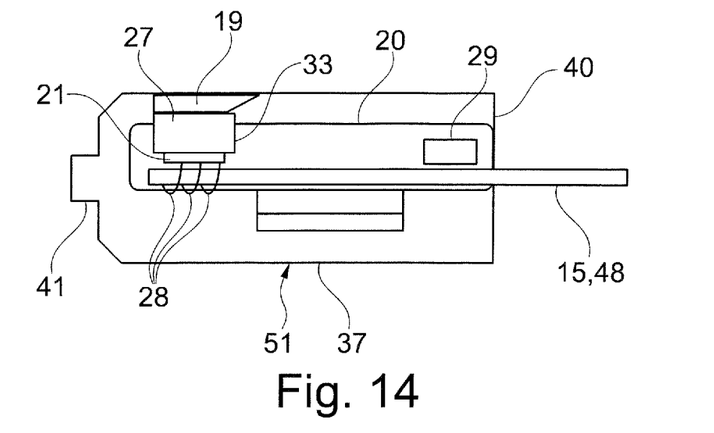
FIG. 14 a cross-sectional view of a singulated vaporizer cartridge in another embodiment.

In an alternative embodiment according to FIG. 14, the wick element 27 is first inserted into the wick receptacle 33 of the vaporizer support 20. The vaporizer housing 37 is advantageously made of two components, in particular injection-molded, wherein a sealing element 19, for example of liquid silicone or another suitable elastomeric material, is inserted in addition to the actual base body of the vaporizer housing 37, for example made of PP, in the region in which the wick receptacle 33 is arranged in the assembled state. When the vaporizer assembly 50 is inserted into the vaporizer housing 37, the elastomeric sealing element 19 is compressed, and permanently exerts a sealing force on the wick element 27.

As an alternative to the two-component vaporizer housing 37, 19 design, a separate sealing ring may be provided as the sealing element 19, which is squeezed through the vaporizer housing 37, for example.

The insertion of the vaporizer assemblies 50 into the vaporizer housings 37 can be done individually, serially or batch-wise. In the case of series production, a plurality of vaporizer housings 37 are preferably connected by webs and produced at the spacing corresponding to the connection stations 12, for example by injection molding.

To complete a vaporizer cartridge 52, a vent 42 is connected to the corresponding vent receptacle 41 of the vaporizer unit 51, for example inserted therein, and then a liquid tank 44 is slid over the vent 42 and the vaporizer unit 51 and connected in a liquid-tight manner to an end flange 40, for example by welding or bonding. The liquid tank 44 is advantageously cylindrical and preferably comprises a shell element 45 and an end face part 46 for closing the end face of the shell element 45 opposite the vaporizer unit 51 or the vaporizer-side interface 40 and/or for holding the end of the vent 42 opposite the vaporizer unit 51, see FIG. 13. Finally, a filling of a liquid reservoir 31 formed inside the liquid tank 44 with a vaporization liquid can take place, for example through a filling opening in the cartridge housing 44. Further, electrical contacts 48, which may be located in a central plane of the vaporizer assembly 50 or the vaporizer unit 51, for example, may be folded over if a planar electrical interface 49 is desired.

Figure 12:
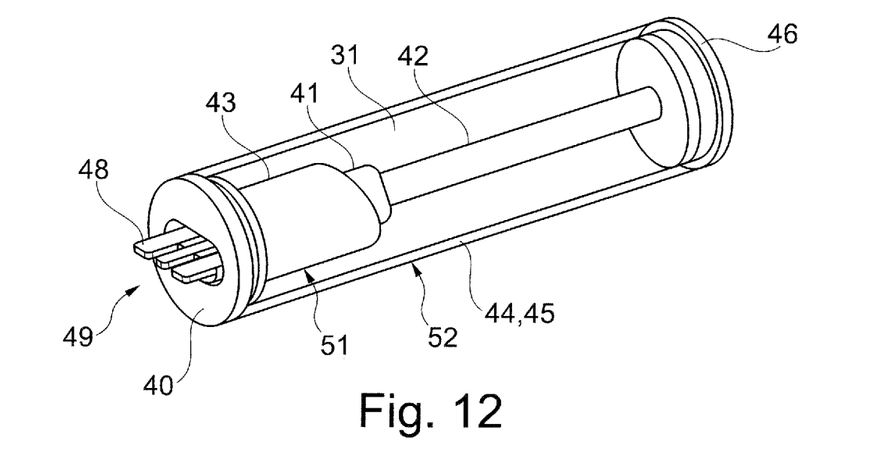
FIG. 12 a perspective view of a singulated vaporizer cartridge.
Figure 13:
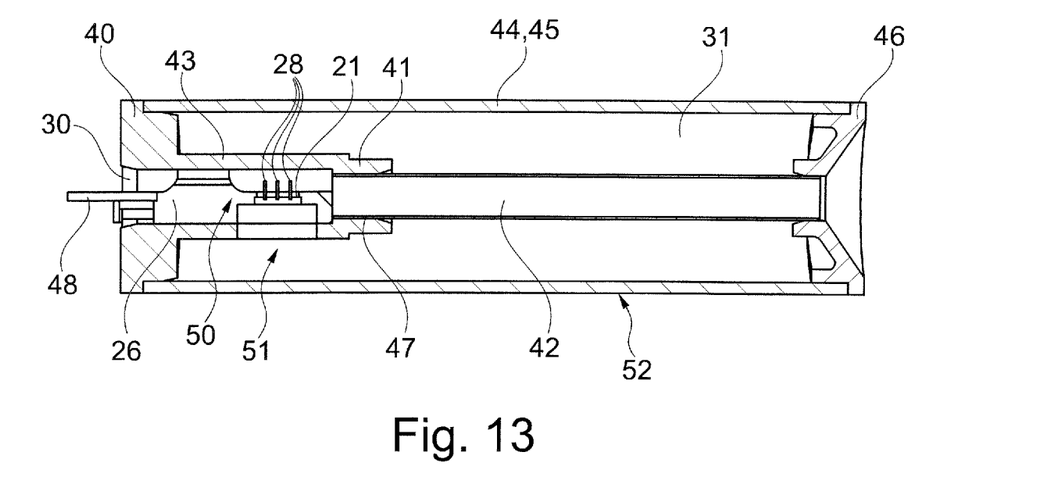
FIG. 13 a cross-sectional view of a singulated vaporizer cartridge.

Finally, there follows a step of singulating the vaporizer units 51 by separating them from the assembly framework 10 or longitudinal web(s) 11, thereby obtaining individual vaporizer assemblies 50, individual vaporizer units 51, or individual vaporizer cartridges 52 as in FIGS. 12 and 13, depending on the timing of the singulation in the assembly process.

Figure 15:
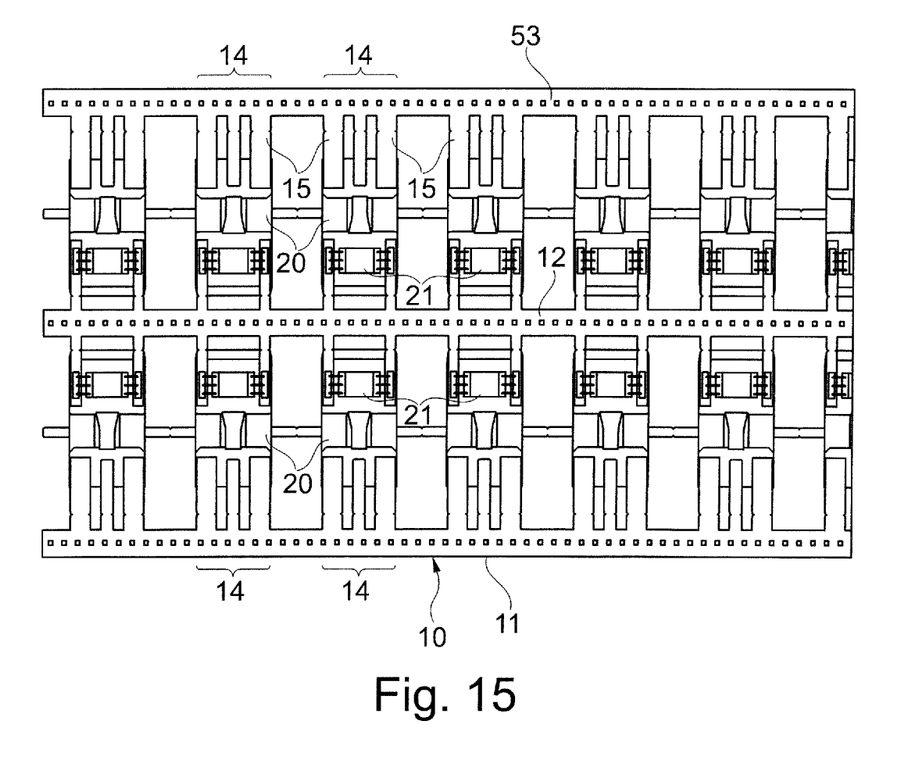
FIG. 15 a top view of a double-width assembly framework.

The embodiment according to FIG. 15 illustrates that the assembly framework 10 can comprise more than two, here for example three parallel longitudinal webs 11, 12, 53, wherein the longitudinal web 12 is arranged centrally and the longitudinal webs 11, 53 are arranged laterally. In this way, two tracks are formed, each with serially arranged connection stations 14, so it is a double-width assembly framework 10. In addition, the assembly framework 10 according to FIG. 15 is in the same state of manufacture as the assembly framework 10 according to FIG. 6 (molded-on vaporizer support 20, connected and wired vaporizers 21), so that further explanation of FIG. 15 can be dispensed with.

The vaporizer 21 is advantageously designed as a microelectromechanical system (MEMS), for example with conduction or microchannels, as described in DE 10 2016 120 803 A1, the disclosure content of which is incorporated to that extent in the present application. Advantageously, this involves a flat silicon heater provided with microchannels, possibly doped. Bionic or capillary-like heater structures, such as bionic meshes, are also possible for the vaporizer 21. Vaporizers 21 with heating structures as described in DE 10 2017 111 119 A1 are also possible, the disclosure content of which is to that extent incorporated in the present application. In general, the invention is not bound to a specific type of vaporizer 21.

EMBODIMENTS

Embodiment 1. Method for manufacturing a vaporizer assembly (50) for an inhaler, characterized by providing a plurality of connection stations (14) and performing at least one assembly step at each connection station (14) to manufacture a vaporizer assembly (50) at each connection station (14).

Embodiment 2. Method according to embodiment 1, characterized in that the connection stations (14) are interconnected by an assembly framework (10).

Embodiment 3. Method according to any of the preceding embodiments, comprising the following assembly step:

Connecting a vaporizer support (20) to the or each connection station (14), in particular by overmolding the assembly framework (10) with a plastic material.

Embodiment 4. Method according to any of the preceding embodiments, comprising the following assembly step:

Bonding a vaporizer (21) to the or each connection station (14), in particular by means of an adhesive (22).

Embodiment 5. Method according to any one of the preceding embodiments, comprising the following assembly step:

Providing at least one electrically conductive connection surface (18) at each connection station (14).

Embodiment 6. Method according to embodiment 5, comprising the following assembly step:

electrically connecting and/or wiring the vaporizer (21) to the or each electrically conductive connection surface.

Embodiment 7. Method according to any one of the preceding embodiments, comprising the following assembly step:

at least partially singulating the at least partially assembled vaporizer assembly (50), in particular by separating it from the assembly framework (10).

Embodiment 8. Method according to any of the preceding embodiments, comprising one or more of the group of following assembly steps:

placing and/or connecting a wick element (27) in or to the or each vaporizer assembly (50);
placing at least one sealing element (19, 34) for fluid sealing in or on the or each vaporizer assembly (50);
placing and/or connecting an identification element (29) in or to the or each vaporizer assembly (50);
enclosing the or each vaporizer assembly (50) with a vaporizer housing (37);
connecting a vent (42) to a vent receptacle (41) of the or each vaporizer assembly (50);
mounting and/or filling a liquid tank (44) to the or each vaporizer assembly.

Embodiment 9. Method according to any one of the preceding embodiments, characterized in that the assembly framework (10) is belt-shaped, preferably provided in a substantially endless manner, and is advanced to perform assembly steps, preferably in a work-clocked manner.

Embodiment 10. Assembly framework (10) for use in at least one assembly device for carrying out the assembly method according to any of the preceding embodiments.

Embodiment 11. Assembly framework (10) according to embodiment 10, characterized in that the assembly framework (10) is metallic, belt-shaped and/or rollable/unrollable.

Embodiment 12. Assembly framework according to embodiment 10 or 11, characterized in that the assembly framework (10) comprises at least one, advantageously several, longitudinal webs (11, 12) extending in an advancing direction, wherein the connection stations (14) are advantageously arranged in one or more rows parallel to the longitudinal webs (11, 12).

Embodiment 13. Assembly framework according to embodiment 12, characterized in that guide elements or openings (13) are provided at periodic distances on or in at least one longitudinal web (11, 12).

Embodiment 14. Assembly framework according to embodiment according to one of the embodiments 9 to 12, characterized in that the assembly framework (10) comprises at each connection station (14) at least one transverse web (15, 16) which extends transversely starting from at least one longitudinal web (11, 12).

Embodiment 15. Assembly framework according to embodiment 14, characterized in that at least a part of the at least one transverse web (15, 16) remains permanently on or in the vaporizer assembly (50) and advantageously forms at least one electrical connection (48) for electrical contacting of the vaporizer (21).

LIST OF REFERENCE SIGNS 10 assembly framework
11 longitudinal web
12 longitudinal web
13 guide opening
14 connection station
15, 16 transverse web
17 spacer
18 connecting surface
19 sealing element
20 vaporizer support
21 vaporizer
22 adhesive
23 application device
24 print head
25 print stamp
26 air channel
27 wick element
28 electrical line
29 digital identification element
30 end face opening
31 liquid reservoir
32 lower shell
33 wick receptacle
34 sealing element
35 hollow space
36 liquid inlet opening
37 vaporizer housing
38, 39 end faces
40 flange
41 vent receptacle 42 vent
43 shell part
44 cartridge housing
45 shell element
46 end face part
47 vent opening
48 electrical connections
49 electrical interface
50 vaporizer assembly
51 vaporizer unit
52 vaporizer cartridge
53 longitudinal web

The invention claimed is:

1. A method for manufacturing vaporizer assemblies for inhalers, comprising:
providing a plurality of connection stations; and
performing at least one assembly step at each connection station to manufacture one vaporizer assembly at each connection station;
wherein the plurality of connection stations are interconnected by a metallic assembly framework;
wherein the metallic assembly framework is belt-shaped and is advanced in an advancing direction to perform the at least one assembly step;
wherein the at least one assembly step comprises connecting a vaporizer support to each connection station and bonding a vaporizer via an adhesive to the vaporizer support connected at each connection station;
wherein the metallic assembly framework comprises a plurality of longitudinal webs extending in the advancing direction;
wherein the metallic assembly framework comprises, at each connection station, at least one transverse web that extends transversely to the longitudinal webs; and
wherein connecting the vaporizer support to each connection station comprises overmolding the at least one transverse web at each connection station with a plastic material.

2. The method according to claim 1, wherein the at least one assembly step further comprises: providing at least one electrically conductive connection surface at each connection station.

3. The method according to claim 2, wherein the at least one assembly step further comprises: electrically connecting and/or wiring each vaporizer to the at least one electrically conductive connection surface at each connection station.

4. The method according to claim 1, wherein the at least one assembly step further comprises: separating an at least partially assembled vaporizer assembly from the metallic assembly framework.

5. The method according to claim 1, wherein the at least one assembly step further comprises one or more of the following assembly steps:
placing and/or connecting a wick element in or to each vaporizer assembly;
placing at least one sealing element for fluid sealing in or on each vaporizer assembly;
placing and/or connecting an identification element in or to each vaporizer assembly;
enclosing each vaporizer assembly with a vaporizer housing;
connecting a vent to a vent receptacle of each vaporizer assembly;
mounting and/or filling a liquid tank to each vaporizer assembly.

* * * * *